(12) United States Patent
Salter et al.

(10) Patent No.: US 9,212,809 B2
(45) Date of Patent: Dec. 15, 2015

(54) PHOTOLUMINESCENT DYNAMIC LIGHTING

(71) Applicant: Ford Global Technologies, LLC, Dearborn, MI (US)

(72) Inventors: Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/518,363

(22) Filed: Oct. 20, 2014

(65) Prior Publication Data

US 2015/0198319 A1 Jul. 16, 2015

Related U.S. Application Data

(63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013, application No. 14/518,363, which is a continuation-in-part of application No. 14/267,438, filed on May 1, 2014.

(51) Int. Cl.
| | |
|---|---|
| *B60Q 1/00* | (2006.01) |
| *B60Q 3/00* | (2006.01) |
| *B60Q 3/04* | (2006.01) |
| *B60Q 11/00* | (2006.01) |
| *F21V 25/10* | (2006.01) |

(Continued)

(52) U.S. Cl.
CPC ............... *F21V 25/10* (2013.01); *B60Q 3/008* (2013.01); *B60Q 3/0209* (2013.01); *B60Q 3/0293* (2013.01); *F21V 9/10* (2013.01)

(58) Field of Classification Search
CPC ......... F21V 25/10; F21V 9/10; B60Q 3/0293; B60Q 3/044; B60Q 1/124; B60Q 1/2619; B60Q 13/04; B60Q 13/12
USPC .......... 313/498–512; 362/487–507, 510, 230, 362/482
See application file for complete search history.

(56) References Cited

U.S. PATENT DOCUMENTS

| | | | |
|---|---|---|---|
| 5,678,913 A | * | 10/1997 | Ishimaru ................ B60K 35/00 362/23.07 |
| 6,729,738 B2 | | 5/2004 | Fuwausa et al. |
| 6,773,129 B2 | | 8/2004 | Anderson, Jr. et al. |

(Continued)

FOREIGN PATENT DOCUMENTS

| | | |
|---|---|---|
| CN | 201169230 Y | 12/2008 |
| CN | 201193011 Y | 2/2009 |

(Continued)

*Primary Examiner* — Anne Hines
*Assistant Examiner* — Jose M Diaz
(74) *Attorney, Agent, or Firm* — Vichit Chea; Price Heneveld LLP

(57) ABSTRACT

A lighting apparatus is disclosed. The lighting apparatus comprises a circuit configured to be disposed in a panel defining a cavity forming an opening. The circuit comprises a light source in communication with a controller and configured to emit a first emission. A photoluminescent portion is disposed proximate the light source and is configured to convert at least a portion of the first emission to a second emission. The second emission is output from the cavity to provide ambient light.

18 Claims, 12 Drawing Sheets

(51) Int. Cl.
*F21V 9/10* (2006.01)
*B60Q 3/02* (2006.01)

(56) References Cited

U.S. PATENT DOCUMENTS

| | | | |
|---|---|---|---|
| 6,871,986 B2 | 3/2005 | Yamanaka et al. | |
| 6,914,521 B2 | 7/2005 | Rothkop | |
| 6,985,073 B1 | 1/2006 | Doan | |
| 6,990,922 B2 | 1/2006 | Ichikawa et al. | |
| 7,063,430 B2 * | 6/2006 | Greiner | 362/23.19 |
| 7,213,923 B2 | 5/2007 | Liu et al. | |
| 7,264,366 B2 | 9/2007 | Hulse | |
| 7,264,367 B2 | 9/2007 | Hulse | |
| 7,738,054 B2 * | 6/2010 | Okumura et al. | 349/68 |
| 7,753,541 B2 | 7/2010 | Chen et al. | |
| 7,834,548 B2 | 11/2010 | Jousse et al. | |
| 7,938,566 B2 | 5/2011 | Ishida et al. | |
| 8,016,465 B2 | 9/2011 | Egerer et al. | |
| 8,018,135 B2 * | 9/2011 | Van De Ven et al. | 313/498 |
| 8,075,173 B2 | 12/2011 | Shallcross et al. | |
| 8,162,519 B2 | 4/2012 | Salter et al. | |
| 8,203,260 B2 | 6/2012 | Li et al. | |
| 8,330,385 B2 | 12/2012 | Salter et al. | |
| 8,408,766 B2 | 4/2013 | Wilson et al. | |
| 8,466,438 B2 | 6/2013 | Lambert et al. | |
| 8,519,362 B2 | 8/2013 | Labrot et al. | |
| 8,606,430 B2 | 12/2013 | Seder et al. | |
| 8,724,054 B2 | 5/2014 | Jones | |
| 8,773,012 B2 | 7/2014 | Ryu et al. | |
| 8,922,108 B2 * | 12/2014 | Hussell et al. | 313/483 |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2008/0029720 A1 * | 2/2008 | Li | 250/581 |
| 2009/0219730 A1 | 9/2009 | Syfert et al. | |
| 2010/0172122 A1 * | 7/2010 | Ramer et al. | 362/84 |
| 2011/0141760 A1 | 6/2011 | Ory et al. | |
| 2012/0001406 A1 | 1/2012 | Paxton et al. | |
| 2012/0200428 A1 | 8/2012 | Lynam et al. | |
| 2013/0027976 A1 | 1/2013 | Robbins et al. | |
| 2013/0335994 A1 | 12/2013 | Mulder et al. | |
| 2014/0266666 A1 | 9/2014 | Habibi | |

FOREIGN PATENT DOCUMENTS

| | | |
|---|---|---|
| DE | 29708699 U1 | 7/1997 |
| DE | 10319396 A1 | 11/2004 |
| EP | 1793261 A1 | 6/2007 |
| EP | 2676841 A1 | 12/2013 |
| EP | 2778209 A1 | 9/2014 |
| JP | H05229385 A | 9/1993 |
| JP | 2000159011 A | 6/2000 |
| WO | 2006047306 A1 | 5/2006 |
| WO | 2014068440 A1 | 5/2014 |

* cited by examiner

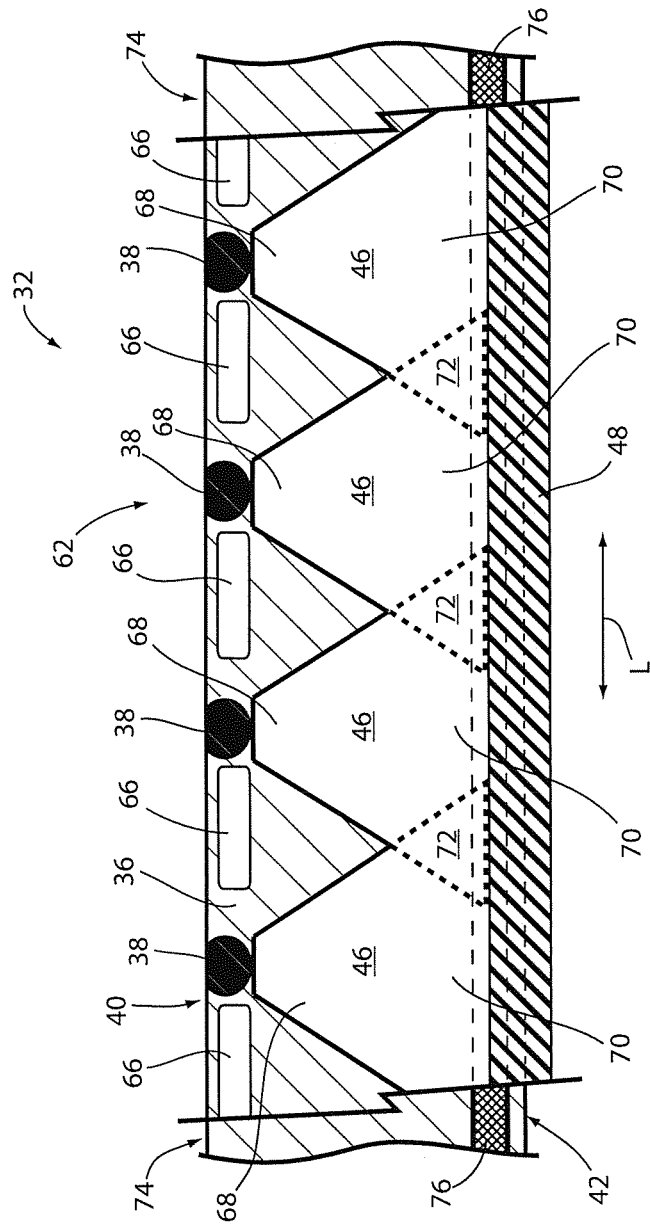
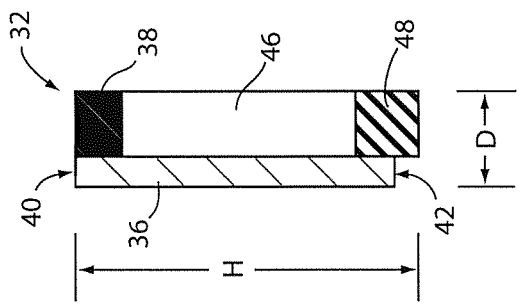
FIG. 3B
FIG. 3A

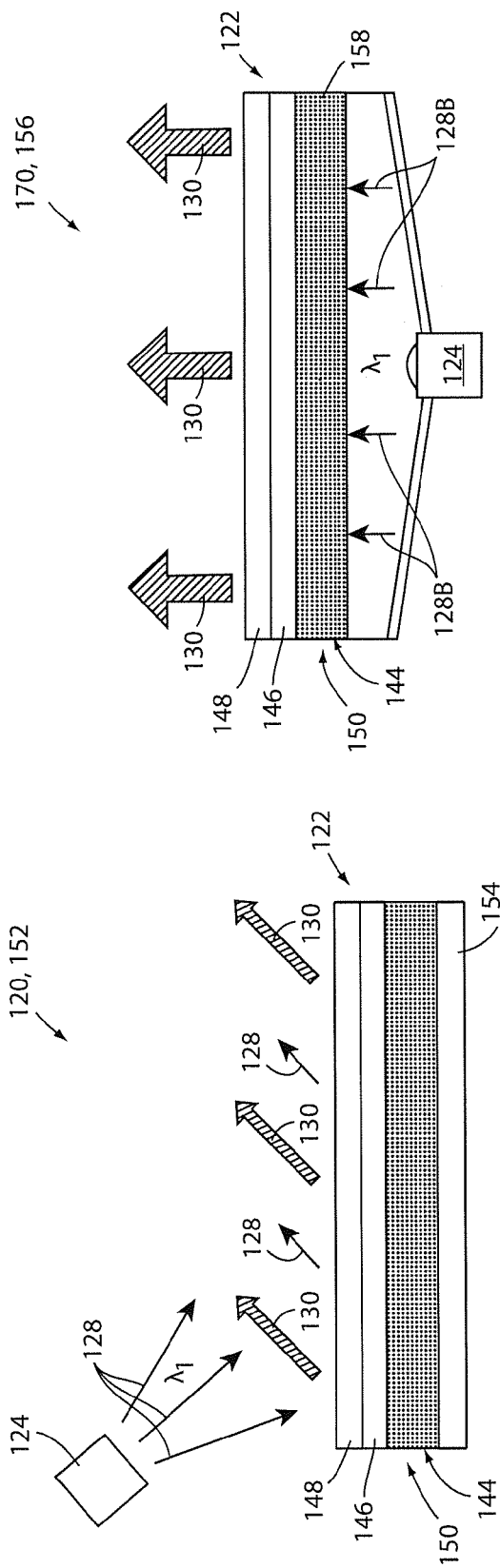

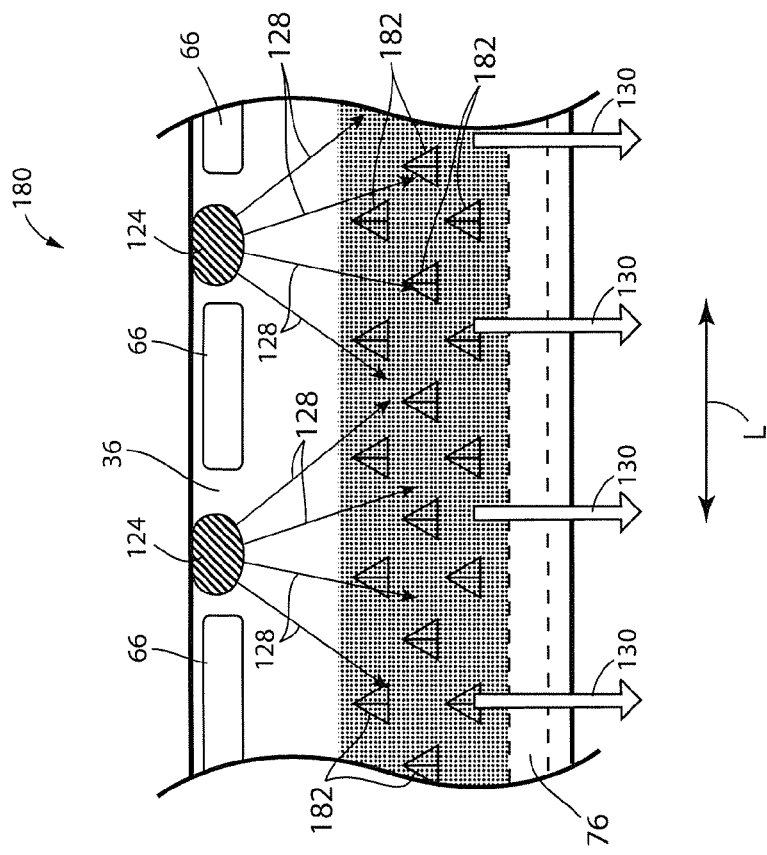
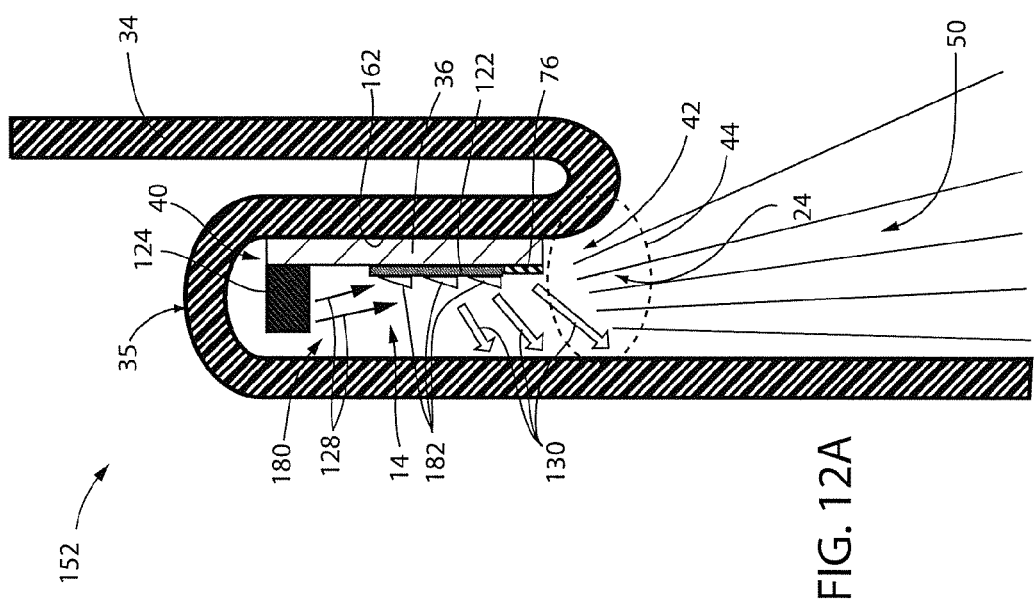
FIG. 12B
FIG. 12A

PHOTOLUMINESCENT DYNAMIC LIGHTING

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." This application is also a continuation-in-part of U.S. patent application Ser. No. 14/267,438, filed May 1, 2014, entitled "ESD PROTECTION FOR DYNAMIC LIGHTING." The aforementioned related application is hereby incorporated by reference in its entirety.

FIELD OF THE INVENTION

The present invention generally relates to lighting apparatuses, and more particularly relates to a lighting apparatus configured to protect a light source from an electrical discharge.

SUMMARY OF THE INVENTION

According to one aspect of the present invention, a lighting apparatus is disclosed. The lighting apparatus comprises a circuit configured to be disposed in a panel defining a cavity forming an opening. The circuit comprises a light source in communication with a controller and configured to emit a first emission. A photoluminescent portion is disposed proximate the light source and is configured to convert at least a portion of the first emission to a second emission. The second emission is output from the cavity to provide ambient light.

According to another aspect of the present invention, a lighting apparatus is disclosed. The lighting apparatus comprises a circuit configured to be disposed in a panel defining a cavity. The circuit comprises a light source in communication with a controller. The light source is configured to emit a first emission through at least a portion of the cavity to a photoluminescent portion. The photoluminescent portion is configured to convert at least a portion of the first emission to a second emission that is output from the cavity.

According to yet another aspect of the present invention, a lighting apparatus is disclosed. The lighting apparatus comprises a circuit configured to be disposed in a panel defining a cavity. The circuit comprises a light source in communication with a controller. The light source is configured to emit a first emission through at least a portion of the cavity toward a photoluminescent portion. The photoluminescent portion is configured to convert at least a portion of the first emission to a second emission that is output from the cavity.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3A is a cross-sectional view of a lighting apparatus including a plurality of lenses;

FIG. 3B is a front view of a lighting apparatus including a plurality of lenses;

FIG. 8 is schematic view of a front-lit configuration of a lighting apparatus configured to convert a first wavelength of light to at least a second wavelength;

FIG. 9 is schematic view of a back-lit configuration of a lighting apparatus configured to convert a first wavelength of light to at least a second wavelength;

FIG. 12A is a cross-sectional view of a panel of a vehicle forming a cavity demonstrating an implementation of a lighting apparatus; and FIG. 12B is a front view of the lighting apparatus introduced in FIG. 12A in accordance with the disclosure.

DETAILED DESCRIPTION OF THE PREFERRED EMBODIMENTS

Figure 1:
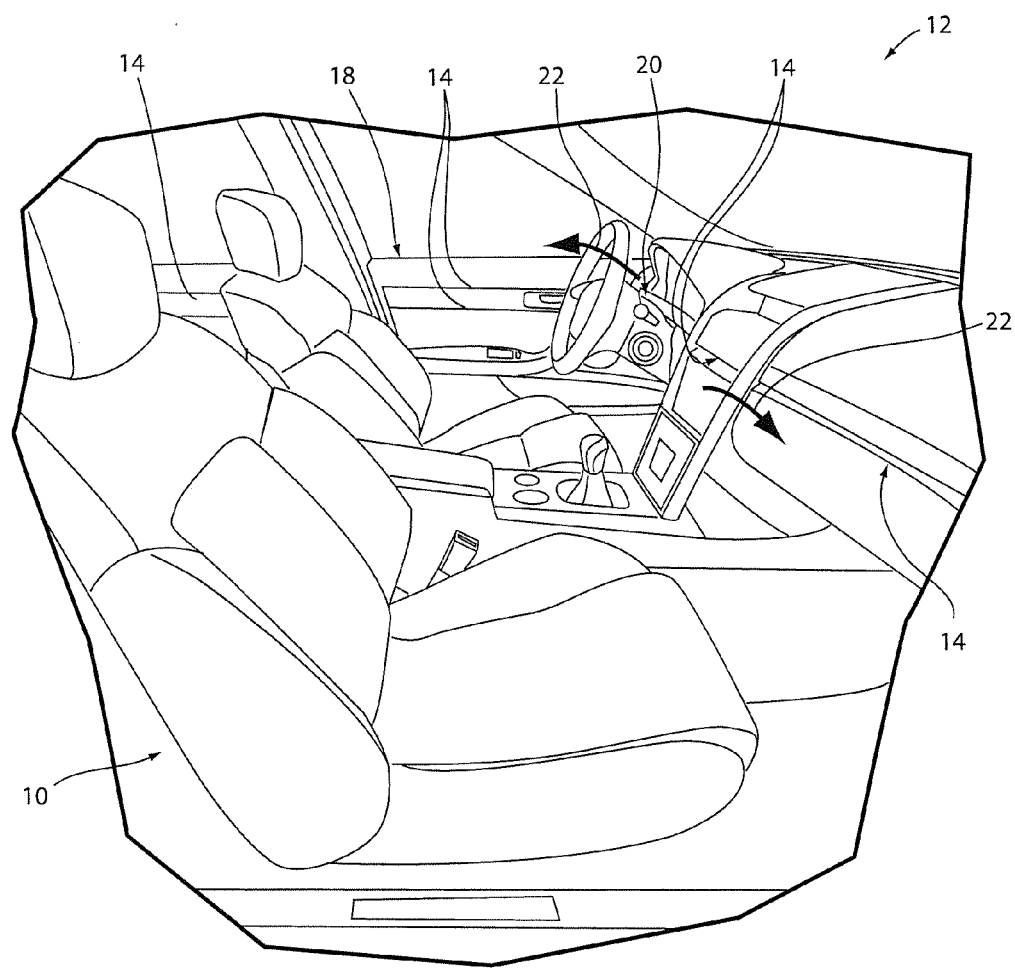
FIG. 1 is an perspective view of a passenger compartment of a vehicle.

Referring to FIG. 1, a perspective view of a passenger compartment 10 of a vehicle 12 is shown in accordance with the disclosure. The vehicle 12 is equipped with a lighting system, for example a dynamic lighting system including a plurality of lights. The lighting system may be implemented by a lighting apparatus or device comprising a rigid or flexible/pliable circuit disposed in any number of cavities 14 throughout the interior of the vehicle 12. In various embodiments, the lighting system may be implemented to provide ambient lighting for the passenger compartment 10 of the vehicle 12. The lighting system is configured to provide a continuous back-lit glowing light emitted along a length of each of the cavities 14. The ambient lighting provided by the lighting system may be utilized to provide various interior lighting features. For example, the lighting system may provide for dynamic lighting that may be implemented to create a visual effect of moving lighting throughout the passenger compartment 10.

The dynamic lighting provided by the lighting system may be utilized to create various visual effects that may provide a visually pleasing aesthetic in the passenger compartment 10. The lighting system may provide various lighting output functions in response to a plurality of vehicle controls or inputs. The lighting system may be controlled via a central controller in communication with the vehicle inputs. A dynamic lighting function of the lighting system may be activated in response to a passenger door 18 of the vehicle 12 opening or closing, a locking or unlocking operation, a vehicle ignition or shutdown event, or any other events that may occur during entry and operation of the vehicle 12.

Dynamic lighting may refer to light emitted from one or more light sources to provide dimming, brightening, or any sequential activation of light sources in a sequence. Dynamic lighting may also refer to any other form of light emitted from a plurality of light sources configured to change a brightness or color or illuminate a plurality of lights in various positions over time. For example, the lighting system may be implemented to provide dynamic lighting that appears to move from a steering column 20, through the cavities 14, and around the passenger compartment 10 in response to a vehicle ignition event. In this example, the motion of the dynamic lighting is demonstrated by the arrows 22. The lighting system is configured to provide various benefits including cost-effective embodiments of dynamic lighting while maintaining robust operation including protection from electrostatic discharge (ESD).

Various modern lighting systems implement light emitting diodes (LEDs) as light sources. LEDs provide various benefits including long life and limited power usage, but also may be susceptible to damage due to electricity that is discharged within their proximity such as static discharge from occupants or from other sources. The lighting system disclosed herein provides for a novel approach to implement dynamic lighting in the vehicle 12 by including an exposed conductive portion on a circuit proximate an opening 24 of each of the cavities 14. In this way, the circuit of the lighting system is configured such that a package size of the circuit is significantly decreased. Further, each lighting apparatus disposed in the cavities 14 may be safely installed in the passenger compartment near a potential area of ESD without risking damage to the lighting system.

Figure 2:
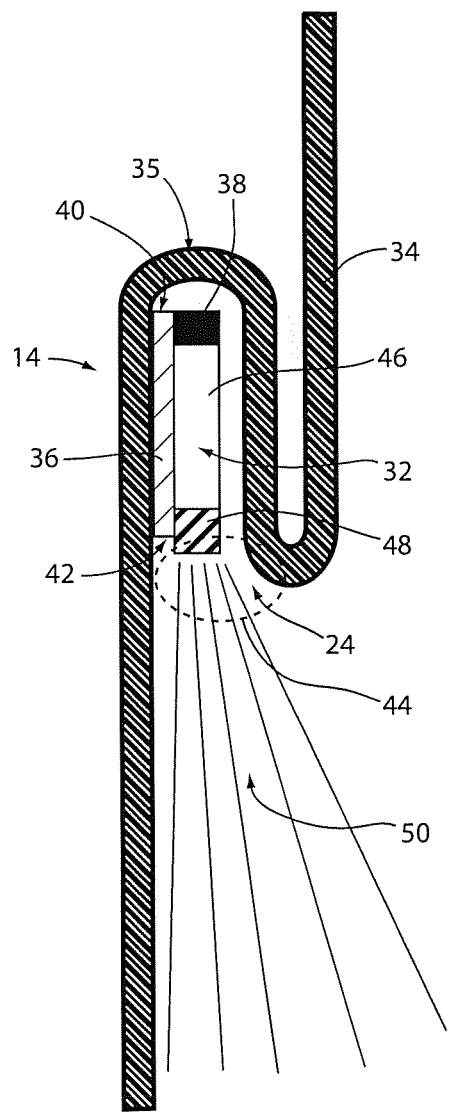
FIG. 2 is a cross-sectional view of a panel of a vehicle forming a cavity demonstrating an assembled, cross-sectional view of a lighting apparatus.

Referring now to FIG. 2, a cross-sectional view of a cavity 14 in a vehicle 12 is shown demonstrating a cross-sectional view of a lighting apparatus 32 of r lighting device for a lighting system. In this example, the cavity 14 is formed by a panel 34 having an enclosed portion 35. The cavity 14 may be formed by any portion of the vehicle 12, for example a trim panel of the vehicle 12. The enclosed portion may correspond to a portion that is not readily accessible by an operator of the vehicle 12. The panel 34 is formed such that the cavity 14 is configured to receive the lighting apparatus 32. The cavity 14 is formed by the panel 34 and extends along an interior surface of the vehicle 12 to form an elongated trough. The elongated trough forms the opening 24 from which light is emitted from the lighting apparatus 32.

Though the panel 34 is shown in this example having a particular shape forming the cavity 14, the lighting apparatus 32 may be implemented in various interior and/or exterior portions of the vehicle 12. For example, a rigid or a flexible circuit 36 may similarly be disposed in a cavity or plurality of cavities formed along a headliner and corresponding headliner trim panels in the vehicle 12. Similarly, the circuit 36 may be disposed in a cavity formed by a panel located along an edge of any panel of the vehicle 12, for example a door panel or a trim panel extending along a trunk liner. In the various examples discussed herein, the term panel may refer to any portion or portions of the vehicle 12. A cavity may be formed by a panel such that the lighting apparatus 32 may be disposed therein. The portion or portions of the vehicle may further form an opening, similar to the opening 24, such that light emitted from the lighting apparatus 32 may pass outward through the opening and provide glowing light emitted from the cavity.

The lighting apparatus 32 comprises the circuit 36 in electrical communication with a light source which, in one embodiment include, at least one light emitting diode (LED) 38. The circuit 36 comprises a first edge portion 40 and a second edge portion 42. The circuit 36 is oriented in the cavity 14 such that second edge portion 42 is oriented proximate the opening 24. The LED 38 is shown connected to the circuit 36 proximate the first edge portion 40. The circuit 36 further comprises a conductive portion, for example an exposed conductive portion proximate the second edge portion 42. The conductive portion corresponds to an isolation terminal that may be implemented by an exposed ground terminal of the circuit 36. The conductive portion is positioned proximate the opening 24 and configured to conduct an electrical discharge, for example an ESD, away from the at least one LED 38.

As discussed previously, LEDs may be implemented to provide various benefits, but may be susceptible to electrical discharges which can cause permanent damage to lighting apparatuses similar to the lighting apparatus 32. To prevent damage from local electrical discharges, LEDs are typically positioned at least 25 mm away from a touchable region. A touchable region may refer to an area or region that may be touched by a passenger of a vehicle such that an electrical discharge may take place in the area. The spacing between an LED and a touchable region leads to excessive space consumption when implementing LEDs in lighting systems or may interfere with the intended lighting effect. The lighting apparatus 32 provides for a significant reduction in the required spacing from a touchable region 44 while preventing damage to the LED 38 from local electrical discharges.

The lighting apparatus 32 provides various benefits including limiting a package size and a corresponding cavity size in which the lighting apparatus 32 may be disposed in the vehicle 12. The lighting apparatus 32 is configured to receive an electrical discharge proximate the touchable region 44 in the vehicle 12 and prevent damage to the at least one LED 38 by providing an isolated, conductive path to conduct the electrical discharge away from the at least one LED 38. Further details of the lighting apparatus 32, the circuit 36, and other components of the lighting apparatus 32 are discussed in further detail in reference to FIGS. 3-5.

The lighting apparatus 32 further comprises a first lens 46 and a second lens 48. The first lens 46 may be a spreader lens. The first lens 46 is configured to receive light from the at least one LED 38 and spread the light along a length of the panel 34. According to one embodiment, the first lens 46 is configured such that light is emitted at a consistent intensity along the opening 24 of the cavity 14. The second lens 48 may be a diffuser lens configured to receive the light from the first lens 46 and further spread or scatter the light. The first and second lenses 46, 48 are configured such that the light from the LED 38 is emitted along the length of the opening 24 to provide a soft uniform ambient glow emitted from the opening 24. An emitted light 50 from the cavity 14 is illustrated in FIG. 2 as a plurality of light rays extending outward from the cavity 14.

The circuit 36 may comprise any printed circuit board (PCB), a flexible or pliable circuit, flexible printed wiring, a flex print or flexi circuit, or any other form of circuit. The flexible circuit 36 may be configured to have various dimensions configured to conform to the proportions of a cavity. In some embodiments the flexible circuit 36 may be configured having a flexible or pliable construction such that the width and length of the circuit may flex and conform to variations in a length of the cavity 14. In some embodiments, the circuit 36 may form a thin, pliable structure providing various benefits allowing the circuit 36 to be implemented having a low profile configured to project an ambient glow from the panel 34 or any structure in which the circuit is implemented.

The circuit 36 may be formed from a variety of materials. In some embodiments, the circuit 36 may be formed of various layers, for example base layers, bonding layers, protective layers, and conductive layers. A base layer may be formed from a base film having a polymer structure such as polyester (PET), polyimide (PI), polyethylene napthalate (PEN), polyetherimide (PEI), as well as various fluropolymers (FEP), copolymers Polyimide films, or other suitable materials. A bonding layer may comprise a bonding adhesive or laminate configured to adhere and seal the conductive layers to the one or more base layers. A bonding adhesive may be of a polymer base or any material operable to bond a conductive layer to a base layer. The conductive layers may comprise conductive elements formed from conductive metal foils or conductive inks, paints or films. The conductive layers may vary in thickness, material and proportions to effectively conduct electrical current for power or signals from a central controller to control the lighting of the at least one LED 38. The conductive elements may comprise any form of conductive material and in some embodiments may be of copper formed of a wrought type, annealed type, electroplated, or any other form. The various materials and constructions of the circuits disclosed herein are exemplary and should not be considered limiting to the disclosure.

A pliable implementation of the circuit 36 may be formed by applying a variety of manufacturing techniques and materials. A rigid or semi-flexible implementation may similarly be manufactured by implementing a variety of techniques. The construction of the circuit may be implemented by any one of or a combination of a single-sided flex circuit, double access flex circuit, sculptured flex circuit, double-sided flex circuit, multilayer flex circuit, rigid-flex circuit, polymer thick film flex circuit, or any other circuit type including those yet to be developed. The specific construction of the circuit 36 may vary to correspond to a variety of applications. The number of layers and particular construction may further vary in implementations that apply the circuit 36 in combination with additional systems, integrated circuits, and data interfaces implemented in the vehicle 12.

The first lens 46 and the second lens 48 may be constructed from any material operable to transfer light therethrough. The first lens 46 is configured to have a triangular profile shape such that light received from the LED 38 is spread from a narrow top portion and distributed through a widened bottom portion. Further details of the lighting apparatus 32 are discussed in reference to FIG. 3B. The second lens 48 may be configured to have an etched, frosted, or roughed surface and/or be constructed having a material structure configured to scatter the light received from the first lens 46. The first lens 46 and the second lens 48 are configured to project the emitted light 50 consistently across the length of the opening 24. In some embodiments, the first lens 46 and the second lens 48 may be of a polymeric material. Though the first lens 46 and the second lens 48 are described as discrete lenses of the lighting apparatus 32, the first lens 46 and the second lens 48 may be combined, molded together, connected to form a single lens, or formed in one piece of the same material. The single lens may be configured to both spread and diffuse light emitted from the at least one LED 38 or if desired, change the color of the emitted light.

Referring now to FIGS. 3A and 3B, a cross-sectional view and a front view of the lighting apparatus 32 are shown respectively. The cross-sectional view of the lighting apparatus 32, shown in FIG. 3A, demonstrates the circuit 36, the at least one LED 38, the first lens 46, and the second lens 48. The lighting apparatus 32 is configured to protect the at least one LED 38 from an electrical discharge and further provide for the lighting apparatus 32 to have a compact package size. In some embodiments, a depth D of the lighting apparatus 32 may be less than 10 mm. A height H of the lighting apparatus may be less than 20 mm. In an exemplary implementation the depth D is approximately 3 mm or less, and the height H is approximately 6 mm or less. In such embodiments the package size of the lighting apparatus 32 may be implemented with the at least one LED 38 being located less than 25 mm from a potential touchable region 44 proximate the second edge portion 42. This advantageous, space-saving design may be implemented while preventing damage to the at least one LED 38 by providing the conductive portion 76 proximate the second edge portion 42.

The front view of the lighting apparatus 32, shown in FIG. 3B, demonstrates an assembled portion 62 of the lighting apparatus 32 demonstrating the circuit 36 and the second lens 48. In FIG. 3B, the lighting apparatus 32 is shown including groupings of the first lens 46 and the at least one LED 38 evenly spaced along a length L of the lighting apparatus 32. Further, a light controller 66 is in communication with each of the at least one LED 38. Each light controller is configured to control the light emitted from the at least one LED 38. In some embodiments, the lighting apparatus 32 may form an elongated flexible assembly configured to emit light consistently along the length L of the lighting apparatus 32.

Each of the light controllers 66 is in communication with a central controller via a control line. In response to a signal from the central controller, each of the light controllers 66 is operable to control the light emitted from each of the LEDs 38 or a designated group of the LEDs 38. Further discussion of various aspects of the lighting apparatus 32, including the central controller, the control line, and other various details are omitted in FIG. 3B for clarity. Such details are discussed further in reference to FIGS. 4 and 5.

The light emitted from each of the LEDs 38 is received by each of the first lenses 46 and distributed along the length L of the lighting apparatus 32 proximate the second edge portion 42. Each of first lenses 46 is configured to have for example the triangular profile shape such that light received from each of the LEDs 38 is spread from a narrow top portion 68 and distributed through a widened bottom portion 70. Each of the first lenses 46 may be arranged such that an overlapping portion 72 is formed between each of the neighboring first lenses 46. The overlapping portion 72 is configured to ensure that light from each LED 38 is distributed evenly to the second lens 48. The second lens 48 is configured to receive light emitted through each of the first lenses 46 and diffuse the light such that the overlapping portion 72 of each of the first lenses 46 is emitted evenly from the lighting apparatus 32. In this configuration, the lighting apparatus 32 is operable to emit light evenly along the length L to generate a consistent ambient glow from the second lens 48.

A cutout portion 74 or partially assembled portion is also shown in FIG. 3B to demonstrate the conductive portion 76 extending proximate the second edge portion 42 of the circuit 36. The length L of the circuit 36 corresponds to the length of the panel 34 and the corresponding opening 24 as shown in FIGS. 1 and 2. The conductive portion 76 corresponds to an isolation terminal that may be implemented by an exposed ground terminal disposed on the circuit 36. The conductive portion 76 is positioned proximate the touchable region 44 and is configured to conduct an electrical discharge, for example an ESD, away from the at least one LED 38 and light controller circuit 66.

Figure 4:
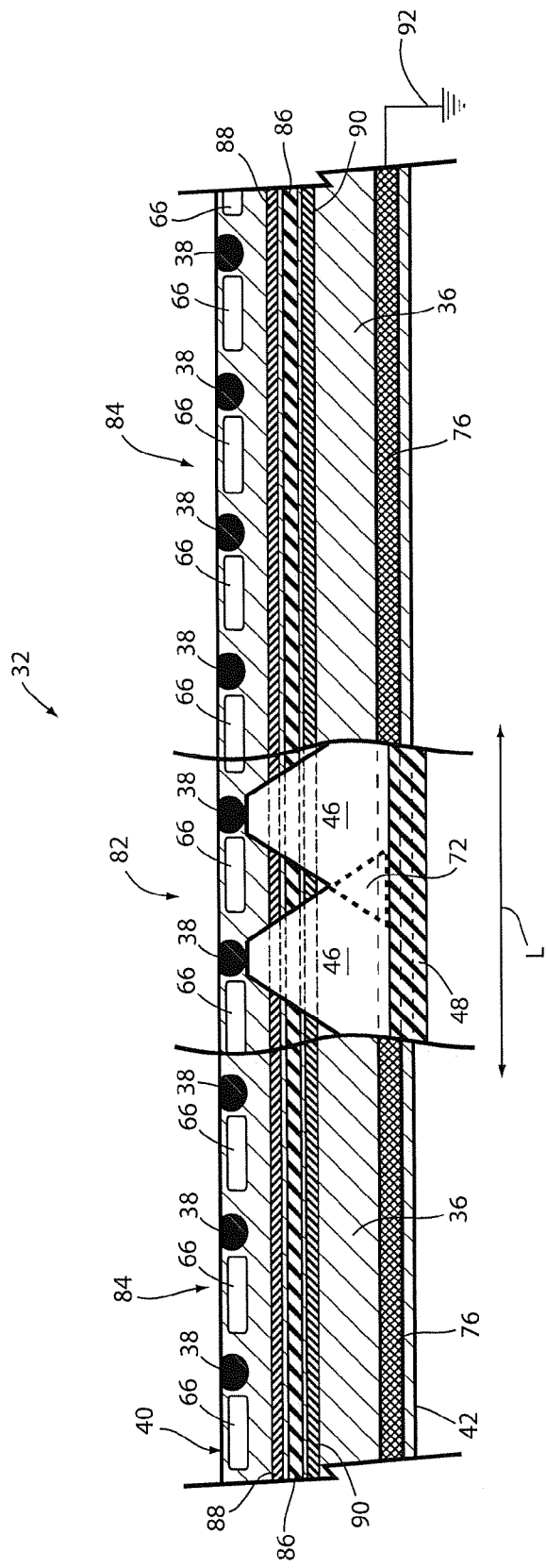
FIG. 4 is a detailed view of a lighting apparatus demonstrating an exposed conductive portion for electrostatic discharge protection.

Referring now to FIG. 4 a detailed view of the lighting apparatus 32 and the circuit 36 is shown. An assembled portion 82 of the lighting apparatus 32 is shown as a reference to demonstrate each of the first lenses 46 and the second lens 48. The circuit 36 is further shown in greater detail than previously described by hiding or removing each of the first lenses 46 and the second lens 48 for clarity as shown in the partially assembled portions 84. The circuit 36 includes each of the light controllers 66 and the LEDs 38 located proximate the first edge 40. Each of the light controllers 66 and LEDs 38 is spaced uniformly along the length L of the circuit 36 to emit the light evenly from the second edge portion 42 along the length L of the circuit 36.

In FIG. 4, further details of the circuit 36 are shown illustrating the control line 86, a system ground line 88 and a power supply line 90. Each of the light controllers 66 is in communication with a central controller via the control line 86. The light controllers 66 are further supplied power through the power supply line 90 and the system ground line 88. The central controller is configured to control each of the light controllers 66 to selectively control the light emitted from each of the LEDs 38. A circuit diagram describing the operation of each of the light controllers 66 by the control line 86 is discussed in reference to FIG. 5.

The conductive portion 76 is disposed proximate the second edge portion 42 of the circuit 36. When disposed in a cavity in the vehicle 12, the conductive portion 76 is positioned proximate the touchable region 44 and the opening 24. The conductive portion 76 is configured to conduct an electrical discharge, for example an ESD, away from the at least one LED 38. The conductive portion 76 is configured to conduct electrical energy proximate the second edge portion 42 to an isolated ground 92. As such, the conductive portion 76 may comprise any conductive material that is exposed to the environment proximate the touchable region 44 to conduct an electrical discharge. Such materials may include copper, aluminum, gold, silver, platinum, iridium, carbon or any other electrically conductive materials that may be incorporated as an exposed layer, wire, coating or terminal of the circuit 36.

Figure 5:
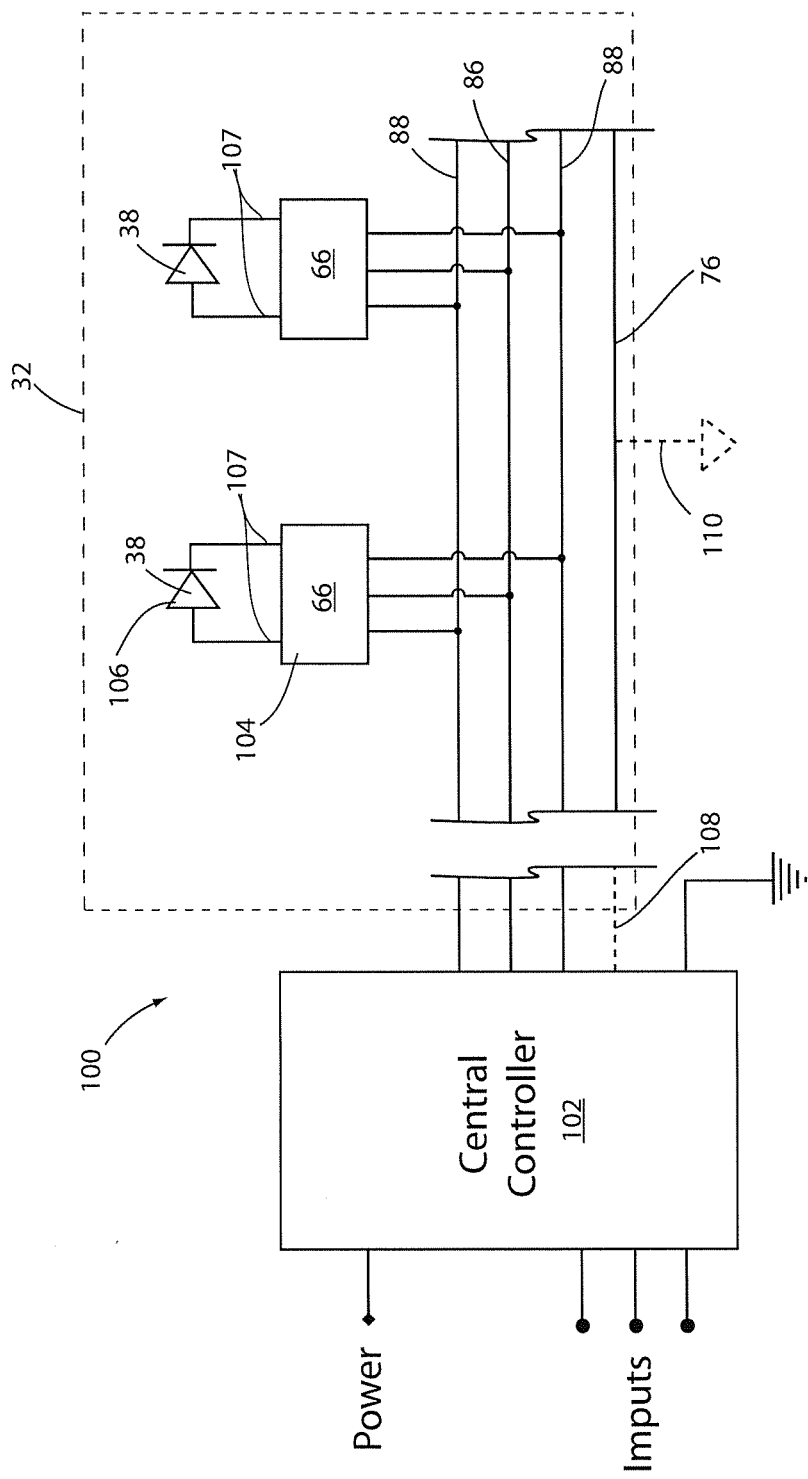
FIG. 5 is a block diagram of a lighting system for a lighting apparatus.

FIG. 5 is block diagram of a lighting system 100 including the lighting apparatus 32 in accordance with the disclosure. Each of the light controllers 66 is in communication with the central controller 102 via at least the control line 86. The light controllers 66 are configured to receive power from the central controller 102 via the power supply line 90 and the system ground line 88. Each of the controllers 66 is further in communication with and configured to control the at least one LED 38 in response to at least one signal received from the central controller 102 via the control line 86. In this configuration, the central controller 102 is operable to control each of the LEDs 38 by emitting a control signal that may be identified by a specific light controller 104 of the light controllers 66.

For example, the central controller 102 is in communication with the specific light controller 104 via the control line 86. In order to control the lighting intensity, color, and/or frequency or other aspect of the lighting apparatuses associated with a specific light controller 104, the central controller 102 may communicate a signal via the control line 86 including an address or identifier and an instruction corresponding to the specific light controller 104. In response to the receipt of the identifier from the central controller 102, the light controller 104 may respond by activating a specific LED 106 according to the instruction from the central controller 102. In this way, the central controller 102 is configured to selectively activate and control each of the LEDs 38 of the lighting system by communicating signals via the control line 86 to selectively activate specific LEDs of the lighting apparatus 32. Further, the central controller may be configured to control a plurality of lighting apparatuses installed throughout the passenger compartment 10 of the vehicle 12 to provide various dynamic lighting sequences in various locations of the vehicle 12 in a contrasting or coordinated manner.

Each light controller 66 may comprise at least one circuit configured to control the brightness of a connected LED (e.g. the specific LED 106). The light controller 66 comprises a brightness control circuit configured to adjust the brightness or intensity of a light source in response to the signal received from the central controller 102. In response an instruction from the central controller 102, the light controller 104 may supply voltage/current to the LED 106 and vary the intensity of the light emitted based on a voltage/current level or a voltage/current signal. The voltage/current signal is communicated to the LED 106 via terminals 107 connecting each of the light controllers 66 to a corresponding at least one LED 38. In some embodiments, the intensity of a light source may be controlled by a light controller by varying the voltage/current signal in a periodic signal, such as with pulse width modulation. In response to a frequency of the periodic signal, the light source may output a level of light that may be perceived to be brighter or dimmer corresponding to faster and slower frequencies or longer and shorter pulse widths. For example, the LED brightness may be controlled by varying a duty cycle of the voltage/current to control the brightness or intensity level of light emitted from the LED.

Each of the at least one LEDs 38 may correspond to a grouping of LEDs, for example a red green blue (RGB) pixel array, bi-color LED, tri-color LED, multicolor LED, etc. By implementing each of the at least one LEDs 38 as in RGB pixel array, the central controller 102 may be operable to send instructions to each light controller 66 to further control a color of the light emitted from each of the at least one LEDs 38. Though LEDs are discussed in detail in this disclosure, other similar light sources may be implemented in the lighting apparatus 32 disclosed herein. For example, each of the at least one LEDs 38 discussed herein may be implemented by phosphor based LEDs, organic LEDs (OLED), quantum dot LEDs, or any other similar lighting technology that may benefit from protection from a proximate electrical discharge.

The conductive portion 76 as discussed previously is disposed proximate the second edge portion 42 of the lighting apparatus 32. In a first configuration 108, the conductive terminal is in communication with the central controller 102 via an isolated ground. The isolated ground may comprise an earth ground or similar ground configured to isolate the central controller, the light controllers 66 and the LEDs 38 from an electrical discharge. In a second configuration 110, the conductive terminal may be connected directly to an earth ground isolated from the central controller 102. Though two configurations of the conductive portion 76 are demonstrated herein, additional configurations for the conductive portion may vary in conformance with the spirit of the disclosure.

In the various embodiments of the disclosure, the conductive portion 76 may provide an exposed conductive terminal proximate a touchable region 44 of the lighting apparatus 32 to protect the at least one LED 38 from an electrical discharge, for example an ESD. The exposed conductive terminal may be exposed to the environment, proximate the touchable region 44 while each of the control line 86, the system ground line 88, and the power supply line 90 may be coated in a laminate configured to adhere, insulate, and seal the conductive material. As such, the exposed conductive portion 76 may provide an isolated path for an electrical discharge to be conducted away from the at least one LED 38 to prevent damage to the lighting apparatus 32.

In some embodiments, a lighting apparatus as discussed herein may comprise a photoluminescent portion disposed proximate the cavity 14. FIGS. 6A, 6B, 10, 11, 12A, and 12B demonstrate various configurations of lighting apparatuses similar to the lighting apparatus 32. For example, each of the lighting apparatuses may incorporate the light controller 66 configured to control at least one light source, for example the LED 38, in response to a control signal from the central controller 102. Additionally, each of the lighting apparatuses may be configured to be disposed in a cavity, for example the cavity 14, formed by a panel located along an edge of any panel of the vehicle 12. In such configurations, the lighting apparatuses may comprise the conductive portion 76 proximate the second edge portion 42 such that the circuit 36 may be protected from an ESD proximate the touchable region. As such, similar reference numerals may be utilized to describe similar features and elements of the various lighting apparatuses for clarity and to demonstrate various possible combinations that may be implemented in addition to the specific examples disclosed herein.

Figure 6A:
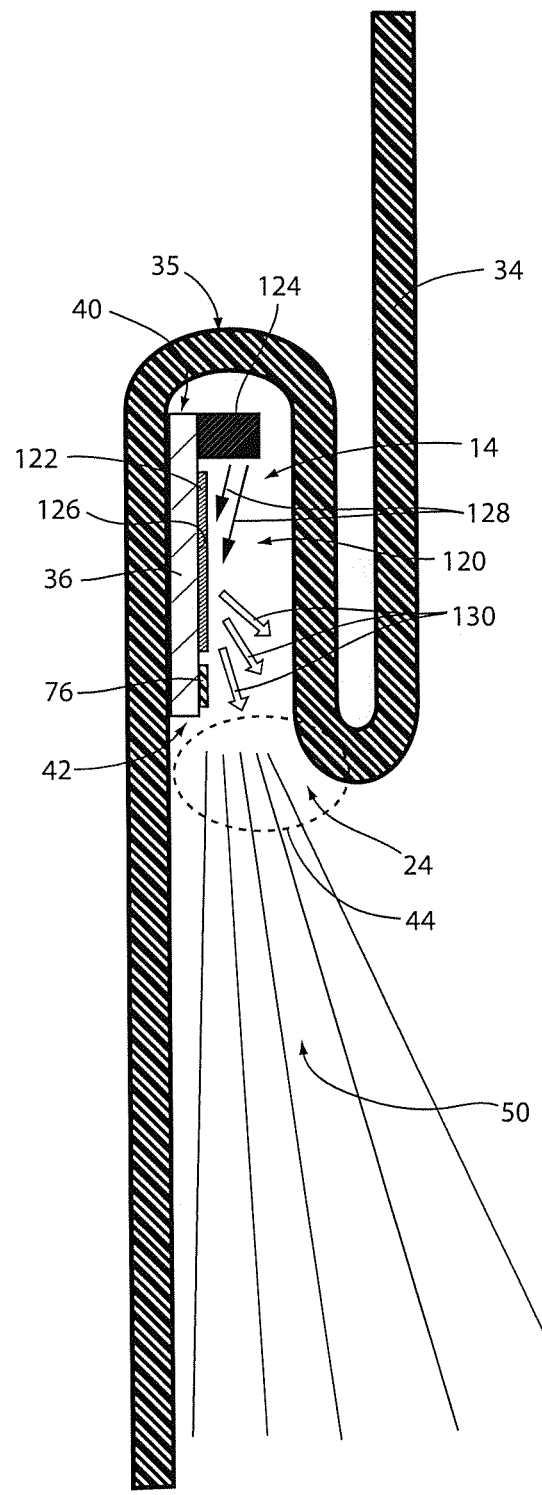
FIG. 6A is a cross-sectional view of a panel of a vehicle forming a cavity demonstrating an implementation of a lighting apparatus.
Figure 6B:
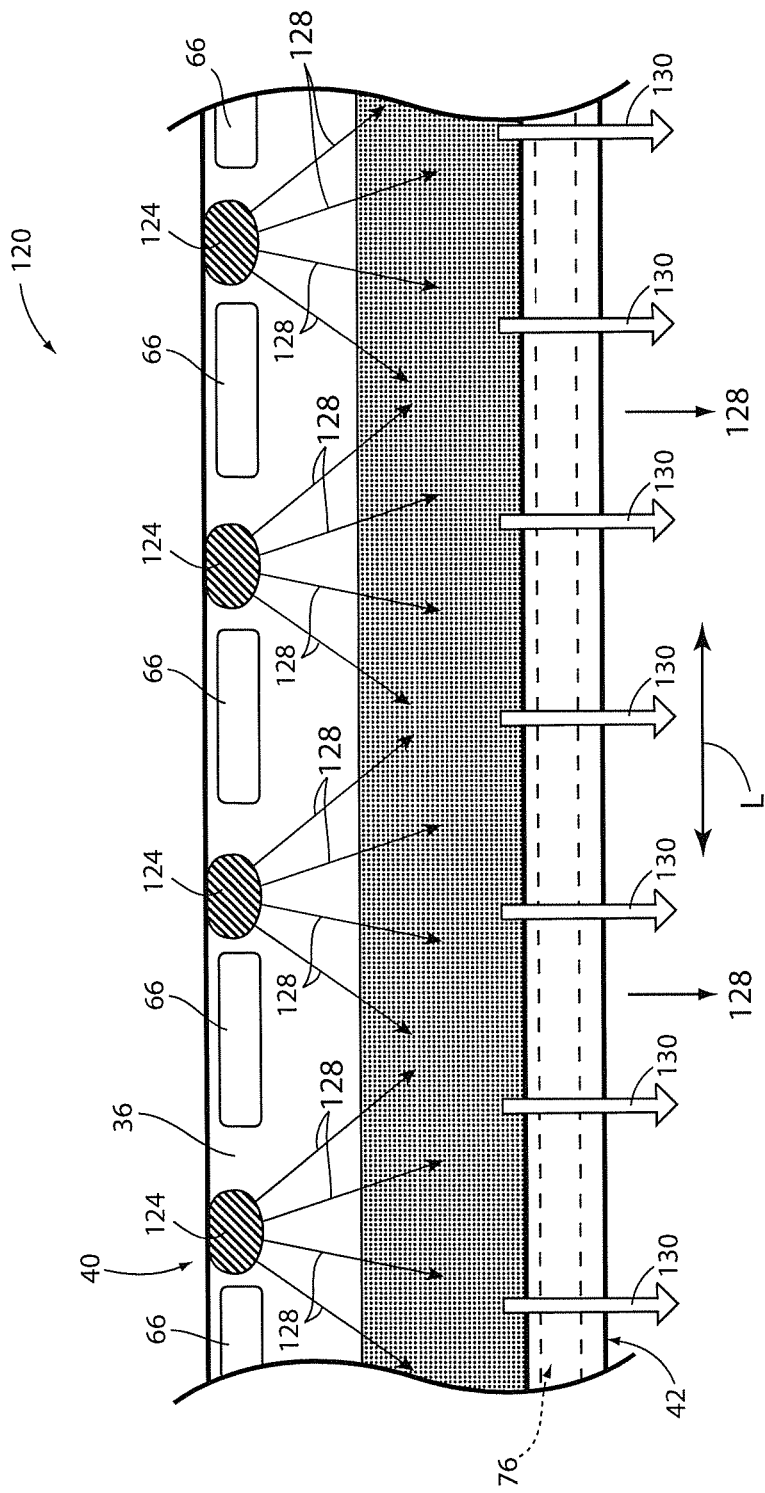
FIG. 6B is a front view of the lighting apparatus introduced in FIG. 6A.

Referring now to FIGS. 6A and 6B, a side cross-sectional view and a front view of an implementation of a lighting apparatus 120, respectively. In some embodiments, the lens 46 described in reference to some embodiments as a spreader lens, may be utilized in combination with or replaced by a photoluminescent portion 122 to spread and diffuse the light emitted from a plurality of light sources 124 along the length L of the lighting apparatus 120. For example, photoluminescent portion 122 may be used in combination with the or instead of the first lens 46 and/or the second lens 48. In such embodiments, the photoluminescent portion 122 may be operable to spread light along the length L of the circuit 36 such that the emitted light from the opening 24 is output uniformly along the opening 24.

The photoluminescent portion 122 may be disposed on a surface 126 of the circuit 36. The surface 126 may face outward into a volume of the cavity 14. The light sources 124 may be configured to emit a first emission 128 directed toward the photoluminescent portion 122. In response receiving the first emission 128, an energy conversion layer of the photoluminescent portion 122 may become excited and emit a second emission 130. The second emission 130 may be converted by the photoluminescent portion 122 from the first emission 128. The second emission 130 emitted from the photoluminescent portion 122 may spread and diffuse the light emitted from the lighting apparatus 120 such that the light is evenly distributed along the length L.

Referring now to FIG. 6B, the first emission 128, emitted from each of the light sources 124, may be directed toward the photoluminescent portion 122 and converted to the second emission 130. The first emission 128 may comprise a first wavelength of light and the second emission 130 may comprise at least a second wavelength of light. The second wavelength of the light may correspond to at least one wavelength having a longer wavelength or spectral emission than the first wavelength. In an exemplary implementation, the first wavelength $\lambda_1$ may be approximately less than 500 nm. The blue spectral color range and shorter wavelengths may be utilized as an excitation source for the photoluminescent portion due to these wavelengths having limited perceptual acuity in the visible spectrum of the human eye. In this way, if an unconverted portion of the first emission escapes outward through the opening 24, the unconverted portion may be limited to the extent that it is not readily perceptible to the human eye.

In some embodiments, the central controller 102 may be configured to adjust a color of the emitted light 50 by sending control signals to the light controllers 66 to adjust an intensity or energy output level of the light source 124. For example, if the light source 124 is configured to output the first emission 128 at a low level, substantially all of the first emission 128 may be converted to the second emission 130. In this configuration, a color of light corresponding to the second emission may be output as the emitted light 50 from the cavity 14. If the light source 124 is configured to output the first emission 128 at a high level, only a portion of the first emission 128 may be converted to the second emission 130. In this configuration, a color of light corresponding to mixture of the first emission 128 and the second emission 130 may be output as the emitted light 50. In this way, each of the light controllers 66 may adjust an intensity or energy level of the first emission 128 to control an output color of the emitted light 50.

Though a low level and a high level of intensity are discussed in reference to the first emission 128, it shall be understood that the intensity of the first emission 128 may be varied among a variety of intensity levels to adjust a hue of the color corresponding to the emitted light 50 from the cavity 14. As described herein, the color of the second emission 130 may be significantly dependent on the particular photoluminescent materials utilized in the photoluminescent portion 122. Additionally, a conversion capacity of the photoluminescent portion may be significantly dependent on a concentration of the photoluminescent materials utilized in the photoluminescent portion 122. By adjusting the range of intensities that may be output from the light source 124, the concentration and proportions of the photoluminescent materials in the photoluminescent portion 122, and the types of photoluminescent materials utilized in the photoluminescent portion 122, the lighting apparatuses discussed herein may be operable to generate a wide range of color hues of the emitted light 50 by blending the first emission 128 with the second emission 130.

Figure 7A:
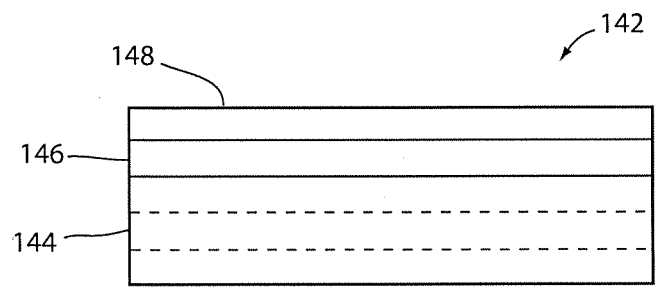
FIG. 7A illustrates a photoluminescent structure rendered as a coating.
Figure 7B:
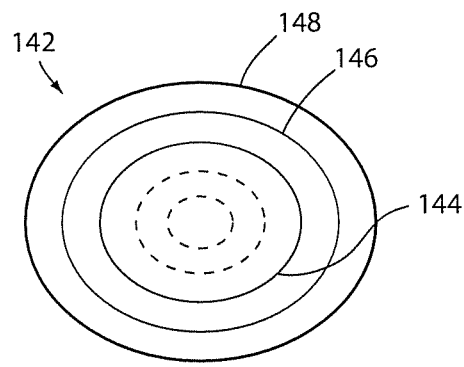
FIG. 7B illustrates the photoluminescent structure rendered as a discrete particle.
Figure 7C:
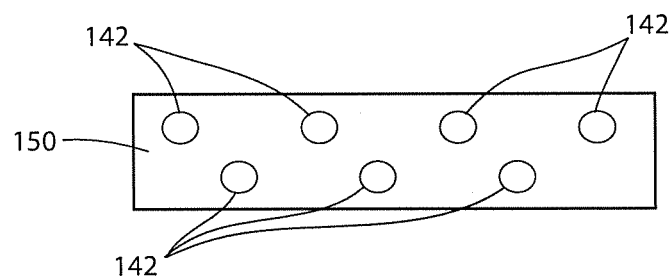
FIG. 7C illustrates a plurality photoluminescent structures rendered as discrete particles and incorporated into a separate structure.

FIG. 7A demonstrates a photoluminescent structure 142 generally shown rendered as a coating (e.g. a film) capable of being applied to the circuit 36 and/or a portion of the panel 34. FIG. 7B demonstrates the photoluminescent structure 142 as a discrete particle capable of being implanted in a material of the circuit 36 or panel 34. FIG. 7C demonstrates the photoluminescent structure 142 as a plurality of discrete particles incorporated into a separate structure capable of being applied to the circuit 36 or panel 34. The photoluminescent structure 142 may correspond to the photoluminescent portions as discussed herein. At the most basic level, the photoluminescent structure 142 includes an energy conversion layer 144 that may be provided as a single layer or a multi-layer structure, as shown through broken lines in FIGS. 7A and 7B.

The energy conversion layer 144 may include one or more photoluminescent materials having energy converting elements selected from phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various embodiments discussed herein, each of the wavelengths of light (e.g. the first wavelength, etc.) correspond to electromagnetic radiation utilized in the conversion process.

Each of the photoluminescent portions may comprise at least one photoluminescent structure 142 comprising an energy conversion layer (e.g. conversion layer 144). The energy conversion layer 144 may be prepared by dispersing the photoluminescent material in a polymer matrix 150 to form a homogenous mixture using a variety of methods. Such methods may include preparing the energy conversion layer 144 from a formulation in a liquid carrier medium and coating the energy conversion layer 144 to a desired planar and/or non-planar substrate of a vehicle panel or the circuit 36. The energy conversion layer 144 coating may be deposited on a vehicle panel by painting, screen-printing, spraying, slot coating, dip coating, roller coating, and bar coating. Additionally, the energy conversion layer 144 may be prepared by methods that do not use a liquid carrier medium.

For example, a solid-state solution (homogenous mixture in a dry state) of one or more photoluminescent materials may be incorporated in a polymer matrix 150 to provide the energy conversion layer 144. The polymer matrix 150 may be formed by extrusion, injection molding, compression molding, calendaring, thermoforming, etc. In instances where one or more energy conversion layers 144 are rendered as particles, the single or multilayered energy conversion layers 144 may be implanted into the circuit 36 and/or a portion of the panel 34. When the energy conversion layer 144 includes a multilayer formulation, each layer may be sequentially coated. Additionally, the layers can be separately prepared and later laminated or embossed together to form an integral layer. The layers may also be coextruded to prepare an integrated multilayered energy conversion structure.

Referring back to FIGS. 7A and 7B, the photoluminescent structure 142 may optionally include at least one stability layer 146 to protect the photoluminescent material contained within the energy conversion layer 144 from photolytic and thermal degradation. The stability layer 146 may be configured as a separate layer optically coupled and adhered to the energy conversion layer 144. The stability layer 146 may also be integrated with the energy conversion layer 144. The photoluminescent structure 142 may also optionally include a protection layer 148 optically coupled and adhered to the stability layer 146 or any layer or coating to protect the photoluminescent structure 142 from physical and chemical damage arising from environmental exposure.

The stability layer 146 and/or the protective layer 148 may be combined with the energy conversion layer 144 to form an integrated photoluminescent structure 142 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 142. Once formed, the photoluminescent structure 142 may be applied to a chosen vehicle panel.

In some embodiments, the photoluminescent structure 142 may be incorporated into the circuit 36 and/or a portion of the panel 34 as one or more discrete multilayered particles as shown in FIG. 7C. The photoluminescent structure 142 may also be provided as one or more discrete multilayered particles dispersed in a polymer matrix 150 that is subsequently applied to a vehicle panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Referring to FIG. 8, a lighting apparatus, for example the lighting apparatus 120, is generally shown according to a front-lit configuration 152. In this configuration, the light or a first emission 128 emitted from the light source 124 is converted to a second emission 130 by the energy conversion layer 144. The first emission 128 comprises a first wavelength $\lambda_1$, and the second emission 130 comprises a second wavelength $\lambda_2$. The lighting apparatus 120 comprises the photoluminescent structure 142 disposed on or in at least one photoluminescent portion. The photoluminescent structure 142 may be rendered as a coating and applied to a substrate of a vehicle panel, for example a portion of the circuit 36 and/or a portion of the panel 34. The photoluminescent material may also be dispersed as a polymer matrix 150 corresponding to the energy conversion layer 144.

In some embodiments, the energy conversion layer 144 may further include the stability layer 146 and/or protective layer 148. In response to the light source 124 being activated, the first emission 128 is received by the energy conversion layer 144 and converted from the first emission 128 having the first wavelength $\lambda_1$ to the second emission 130 having at least the second wavelength $\lambda_2$. The second emission 130 may comprise a plurality of wavelengths configured to emit any color of light from the photoluminescent portion 122.

In various embodiments, the lighting apparatus 120 comprises at least one photoluminescent material incorporated in the polymer matrix 150 and/or energy conversion layer 144 and is configured to convert the first emission 128 at the first wavelength $\lambda_1$ to the second emission 130 having at least the second wavelength $\lambda_2$. In order to generate the plurality of wavelengths, the energy conversion layer 144 may comprise one or more photoluminescent materials configured to emit the second emission 130 as wavelengths of light in the red, green, and/or blue color spectrums. Such photoluminescent materials may further be combined to generate a wide variety of colors of light for the second emission 130. For example, the red, green, and blue-emitting photoluminescent materials may be utilized in a variety of proportions and combinations to control the output color of the second emission 130.

Each of the photoluminescent materials may vary in output intensity, output wavelength, and peak absorption wavelengths based on a particular photochemical structure and combinations of photochemical structures utilized in the energy conversion layer 144. As an example, the second emission 130 may be changed by adjusting the wavelength of the first emission $\lambda_1$ to activate the photoluminescent materials at different intensities to alter the color of the second emission 130. In addition to, or alternatively to the red, green, and blue-emitting photoluminescent materials, other photoluminescent materials may be utilized alone and in various combinations to generate the second emission 130 in a wide variety of colors. In this way, the lighting apparatus 120 may be configured for a variety of applications to provide a desired lighting color and effect for a vehicle.

To achieve the various colors and combinations of photoluminescent materials described herein, the lighting apparatus 120 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are incorporated herein by reference in their entirety.

The light source 124 may also be referred to as an excitation source and is operable to emit at least the first emission 128. The light source 124 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 128. The first emission 128 from the light source 124 may be configured such that the first wavelength $\lambda_1$ corresponds to at least one absorption wavelength of the one or more photoluminescent materials of the energy conversion layer 144 and/or polymer matrix 150. In response to receiving the light at the first wavelength $\lambda_1$, the energy conversion layer 144 may be excited and output the one or more output wavelengths, for example, the second emission having the second wavelength $\lambda_2$. The first emission 128 provides an excitation source for the energy conversion layer 144 by targeting absorption wavelengths of a particular photoluminescent material or combination thereof utilized therein. As such, the lighting apparatus 120 may configured to output the second emission 130 to generate a desired light intensity and color.

In an exemplary implementation, the plurality of light sources 124 comprises LEDS configured to emit the first wavelength $\lambda_1$ which may correspond to a blue spectral, violet, and/or ultra-violet color range. The blue spectral color range comprises a range of wavelengths generally expressed as blue light (~440-500 nm). In some embodiments, the first wavelength $\lambda_1$ may comprise a wavelength in the ultraviolet and near ultraviolet color range (~100-450 nm). In an exemplary implementation, $\lambda_1$ may be approximately equal to 470 nm. Though particular wavelengths and ranges of wavelengths are discussed in reference to the first wavelength $\lambda_1$, the first wavelength $\lambda_1$ may generally be configured to excite any photoluminescent material.

As discussed herein, the plurality of wavelengths corresponding to the second emission 130 may correspond to a plurality of wavelengths configured appear as any color of light and may include a substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm in one embodiment. The plurality of wavelengths may be utilized to generate a wide variety of colors of light from the photoluminescent portion 122 converted from the first wavelength $\lambda_1$.

Figure 11:
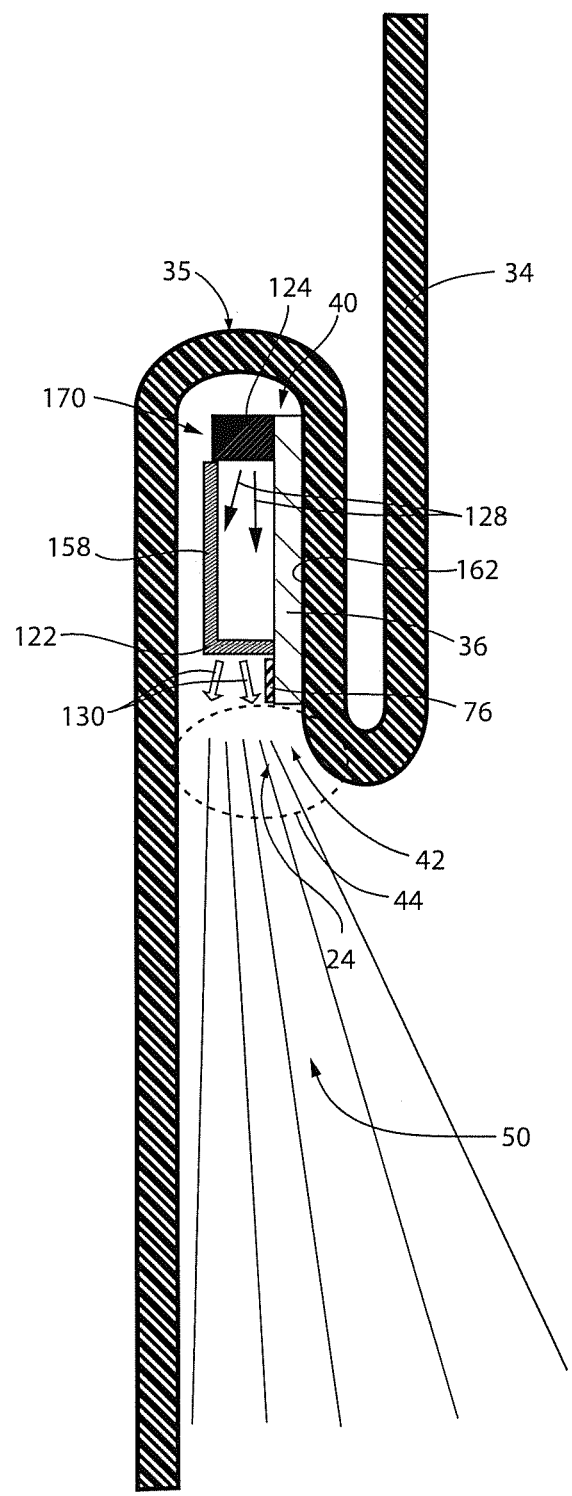
FIG. 11 is a cross-sectional view of a panel of a vehicle forming a cavity demonstrating an implementation of a lighting apparatus.

Referring to FIG. 9, the lighting apparatus, for example the lighting apparatus 170 discussed in reference to FIG. 11, is generally shown according to a back-lit configuration 156 to convert the first emission 128 from the light source 124 to the second emission 130. In this configuration, the first emission 128 may be emitted from the light source 124 toward an optic device 158 having the photoluminescent portion 122 applied thereto and/or disposed therein. The optic device 158 may be of an at least partially light transmissible material such that the first emission 128 may be transmitted through the material, for example a light transmissive polymeric material. Upon passing through the first photoluminescent portion 122, the first emission may be converted to the second emission 130 and output from the optic device 158.

The back-lit configuration 156 may comprise the energy conversion layer 144 and/or photoluminescent material dispersed in a polymer matrix 150. Similar to the energy conversion layer 144 demonstrated in reference to the front-lit configuration 152, the energy conversion layer 144 may be configured to be excited and output the one or more wavelengths corresponding to the second wavelength in response to receiving the first emission 128. The plurality of wavelengths of the second emission 130 may be configured to emit any color of light from the photoluminescent portion 122 in response to the excitation of the energy conversion layer 144. The color of the light corresponding to the second emission 130 may be controlled by utilizing particular types and/or ratio of photoluminescent materials as discussed herein.

Figure 10:
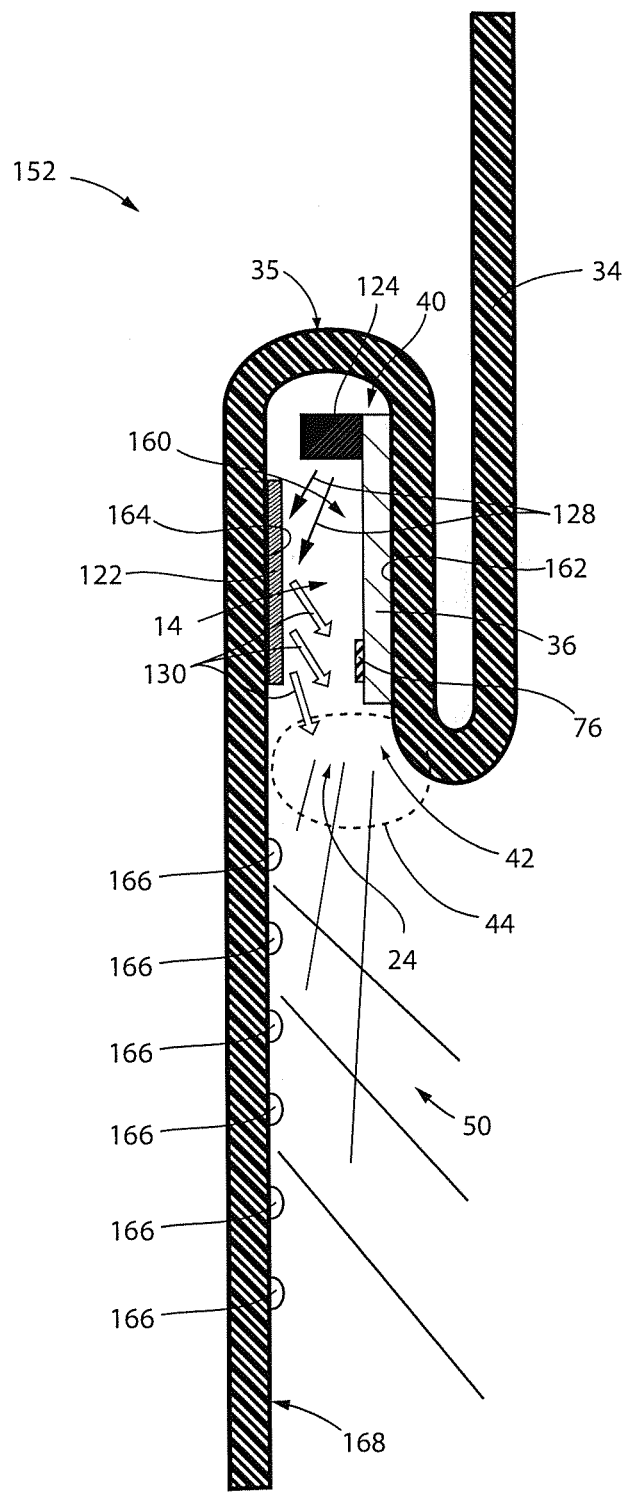
FIG. 10 is a cross-sectional view of a panel of a vehicle forming a cavity demonstrating an implementation of a lighting apparatus.

Referring now to FIG. 10, a lighting apparatus 160 is shown in a front-lit configuration 152. In some embodiments, the circuit 36 of the lighting apparatus 160 may be disposed on a first side 162 of the cavity 14 and the photoluminescent portion 122 may be disposed on a second side 164 of the cavity 14. In this configuration, the light source 124 may be configured to direct the first emission 128 toward the photoluminescent portion 122 disposed on the second side 164. Upon receiving the first emission 128, the photoluminescent portion 122 may convert a significant portion of the first emission 128 to the second emission 130. The second emission 130 may then be emitted outward through the opening 24 of the panel 34 as emitted light 50. The emitted light may have a color significantly corresponding to the second emission 130. As discussed herein, if a portion of the first emission 128 is not converted to the second emission 130, the emitted light 50 may significantly maintain the color properties of the second emission 130 due to the limited visibility of the first emission 128.

The lighting apparatus 160 may further comprise at least one reflective enhancement feature 166 disposed on a light receiving surface 168 of the panel 34 or an additional panel adjacent thereto. The light receiving surface 168 may correspond to a surface in the path of the emitted light 50. The at least one reflective enhancement feature 166 may correspond to one or more molded features of polymeric material similar to the panel 34. The reflective enhancement features 166 may comprise one or more reflective materials, for example aluminum, silver, and other metallic materials, disposed as a coating and/or vacuum metallized structure disposed on an outer surface of the one or more molded features. In this configuration, the reflective enhancement features 166 may reflect the emitted light 50 to produce an enhanced lighting effect.

Referring now to FIG. 11, a lighting apparatus 170 is shown in a back-lit configuration 156. Some embodiments of the lighting apparatus 170 may include the optic device 158 arranged such that the first emission 128 passes through the optic device 158 to be emitted through the opening 24. Upon passing through the optic device 158, the first emission 128 may be converted to the second emission 130. The second emission 130 may then be emitted outward through the opening 24 of the panel 34 as the emitted light 50. The back-lit configuration 156 may ensure that significantly all of the first emission 128 is converted to the second emission 130. However, the addition of the optic device 158 may increase production costs of the lighting apparatus 170.

Referring now to FIGS. 12A and 12B, the lighting apparatus 180 is shown in a side cross-sectional view and a front view, respectively. In some embodiments, the lighting apparatus 180 may comprise a plurality of dispersal features 182 disposed proximate the photoluminescent portion 122. In this particular example, the photoluminescent portion 122 is on disposed a surface of the circuit 36. However, the plurality of dispersal features 182 may similarly be disposed on a side of the cavity 14. For example, the photoluminescent portion 122 and the dispersal features 182 may be disposed on the second surface 164 similar to the example demonstrated in FIG. 10. Additionally, the photoluminescent portion 122 and the dispersal features 182 may be disposed on the first side 162 and the circuit 36 may be disposed on the second side 164.

In the example demonstrated in reference to FIGS. 12A and 12B, the first emission 128 may be emitted from the light source 124 and directed toward the photoluminescent portion 122 and the dispersal features 182. The dispersal features 182 may be formed in a variety of geometric shapes configured to cause the first emission 128 to scatter across the photoluminescent portion 122. In this particular example, each of dispersal features 182 is formed having an elongated pyramid shape that may be configured to scatter the first emission 128 along the length L of the photoluminescent portion 122. In this configuration, the dispersal features 182 may spread the first emission 128 across the length L of the photoluminescent portion 122 to ensure that the first emission 128 is received consistently along the length of the photoluminescent portion 122. By spreading the first emission 128 across the length L of the photoluminescent portion 122, the lighting apparatus 180 may ensure that the first emission 128 is significantly converted to the second emission 130 such that the emitted light 50 is evenly distributed along the length L.

The various devices and systems described herein may be implemented to provide dynamic lighting controlled by a central controller to emit light. The central controller may control a plurality of lighting controllers coupled to LEDs to emit light that appears to move throughout the passenger compartment of a vehicle by sequencing consecutive lighting apparatuses. The lighting systems and lighting apparatuses provide various benefits including cost-effective embodiments of dynamic lighting while maintaining robust operation including protection from ESD. The lighting system disclosed herein provides for a novel approach to implement dynamic lighting in a vehicle by including an exposed conductive portion on a circuit proximate an opening of a cavity in which a lighting apparatus is disposed. The lighting apparatuses discussed herein provide a significantly reduced package size and may be safely installed in a passenger compartment near a potential area of ESD without risking damage to the lighting system.

The methods and devices described above may be implemented in many different ways in many different combinations of hardware, software or both hardware and software. For example, all or parts of the central controller 102 may include circuitry in a controller, microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or any other machine-readable medium.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting apparatus comprising:
   a circuit comprising an exposed conductive portion conductively connected to an isolation terminal configured to be disposed in a panel defining a cavity forming an opening;
   a light source configured to emit a first emission; and
   a photoluminescent portion disposed proximate the light source and configured to convert at least a portion of the first emission to a second emission, wherein the second emission is output from the cavity.

2. The lighting apparatus according to claim 1, wherein the photoluminescent portion is disposed along a length of the circuit.

3. The lighting apparatus according to claim 1, wherein the first emission corresponds to a first color of light and the second emission corresponds to a second color of light.

4. The lighting apparatus according to claim 3, wherein the second color is more acutely visible than the first color.

5. The lighting apparatus according to claim 1, wherein the photoluminescent portion is disposed on a surface of the circuit.

6. The lighting apparatus according to claim 1, wherein the circuit is disposed on a first surface of the cavity and the photoluminescent portion is disposed on a second surface of the cavity.

7. The lighting apparatus according to claim 1, wherein the exposed conductive portion is oriented proximate the opening providing a path for an electrical discharge to protect the light source from the electrical discharge.

8. A lighting apparatus comprising a circuit configured to be disposed in a panel defining a cavity, the circuit comprising:
   a light source and configured to emit a first emission through at least a portion of the cavity to a photoluminescent portion, wherein the photoluminescent portion is configured to convert at least a portion of the first emission to a second emission that is output from the cavity, wherein the circuit comprises an exposed conductive portion conductively connected to an isolation terminal.

9. The lighting apparatus according to claim 8, wherein the first emission corresponds to a first color of light and the second emission corresponds to a second color of light.

10. The lighting apparatus according to claim 9, wherein the first color corresponds to a shorter wavelength of light than the second color.

11. The lighting apparatus according to claim 9, wherein the second color corresponds to a plurality of wavelengths of light.

12. The lighting apparatus according to claim 8, further comprising a controller operable to adjust an intensity of the first emission such that at least a portion of the first emission is output from the cavity.

13. The lighting apparatus according to claim 12, wherein the first color is blended with the second color to generate a third color in response to the output of the portion of the first emission.

14. The lighting apparatus according to claim 12, wherein a color hue of the third color output from the cavity changes in response to the intensity of the first emission.

15. A lighting apparatus comprising a circuit configured to be disposed in a panel defining a cavity, the circuit comprising:
a light source and configured to emit a first emission through at least a portion of the cavity to a photoluminescent portion, wherein photoluminescent portion is configured to convert at least a portion of the first emission to a second emission that is output from the cavity, wherein the photoluminescent portion further comprises a plurality of light dispersal features formed in a elongated pyramid shape extending from a surface of the circuit.

16. The lighting apparatus according to claim 15, wherein the photoluminescent portion is disposed on the surface of the circuit.

17. The lighting apparatus according to claim 15, wherein the plurality of light dispersal features is configured to spread the first emission along the photoluminescent portion.

18. The lighting apparatus according to claim 15, wherein the circuit comprises an exposed conductive portion conductively connected to an isolation terminal.

* * * * *